(12) United States Patent
Palanisamy et al.

(10) Patent No.: US 12,067,387 B2
(45) Date of Patent: Aug. 20, 2024

(54) SOFTWARE MODIFICATION ERROR RESOLUTION AND MANAGEMENT

(71) Applicant: Dell Products, L.P., Hopkinton, MA (US)

(72) Inventors: Kumaravel Palanisamy, Bangalore (IN); Nida Taranum, Bangalore (IN); Yogesh Balgi, Honavar (IN)

(73) Assignee: Dell Products, L.P., Hopkinton, MA (US)

( * ) Notice: Subject to any disclaimer, the term of this patent is extended or adjusted under 35 U.S.C. 154(b) by 127 days.

(21) Appl. No.: 18/152,194

(22) Filed: Jan. 10, 2023

(65) Prior Publication Data
US 2024/0231991 A1    Jul. 11, 2024

(51) Int. Cl.
   *G06F 8/65*      (2018.01)
   *G06F 11/07*     (2006.01)

(52) U.S. Cl.
   CPC ............ *G06F 8/65* (2013.01); *G06F 11/0787* (2013.01); *G06F 11/0793* (2013.01); *G06F 11/0712* (2013.01)

(58) Field of Classification Search
   CPC .......... G06F 11/0793; G06F 8/65; G06F 8/61; G06F 8/60; G06F 8/70
   See application file for complete search history.

(56) References Cited

U.S. PATENT DOCUMENTS

| | | | | |
|---|---|---|---|---|
| 5,351,247 | A * | 9/1994 | Dow | G06F 11/2257 706/14 |
| 5,463,768 | A * | 10/1995 | Cuddihy | G06F 11/079 714/37 |
| 5,790,780 | A * | 8/1998 | Brichta | G06F 11/2205 714/47.1 |
| 9,542,259 | B1 * | 1/2017 | McEwen | G06F 11/2257 |
| 11,327,826 | B1 * | 5/2022 | Shama | G06N 20/00 |
| 2002/0162056 | A1 * | 10/2002 | Forman | G06F 11/2257 714/46 |
| 2006/0248116 | A1 * | 11/2006 | Sobel | G06F 8/65 |
| 2013/0262082 | A1 * | 10/2013 | McKeeman | G06F 40/20 704/9 |
| 2013/0275392 | A1 * | 10/2013 | Bhatt | G06F 16/3331 707/723 |

(Continued)

*Primary Examiner* — Gabriel Chu
(74) *Attorney, Agent, or Firm* — Anderson Gorecki LLP

(57) ABSTRACT

A software update manager is configured to collect logs, container statistics, product configuration information, and system state from an application that is being modified when an issue is encountered during a software modification operation. The software update manager includes an issue analyzer that is configured to analyze the reported issue and search knowledge base article database(s) to determine if the reported issue is a known issue or a previously unknown issue. When the reported issue is a known issue, the software update manager retrieves a known workaround and applies the known workaround on the system to resolve the reported issue and continue the planned software modification operations. When the reported issue is a previously unknown issue, the software update manager identifies the correct engineering team responsible for responding to the reported issue and generates a bug fix request that is submitted to a software bug tracking system.

18 Claims, 7 Drawing Sheets

(56) References Cited

U.S. PATENT DOCUMENTS

| | | | |
|---|---|---|---|
| 2014/0310222 A1* | 10/2014 | Davlos | G06F 11/2294 706/46 |
| 2015/0089309 A1* | 3/2015 | Fu | G06F 11/0724 714/57 |
| 2018/0150348 A1* | 5/2018 | Hecox | G06F 11/0793 |
| 2019/0163594 A1* | 5/2019 | Hayden | G06F 11/3024 |
| 2021/0157665 A1* | 5/2021 | Rallapalli | G06F 11/3068 |
| 2022/0261306 A1* | 8/2022 | Chandrasekaran | G06F 11/079 |

\* cited by examiner

Error processing – known issue

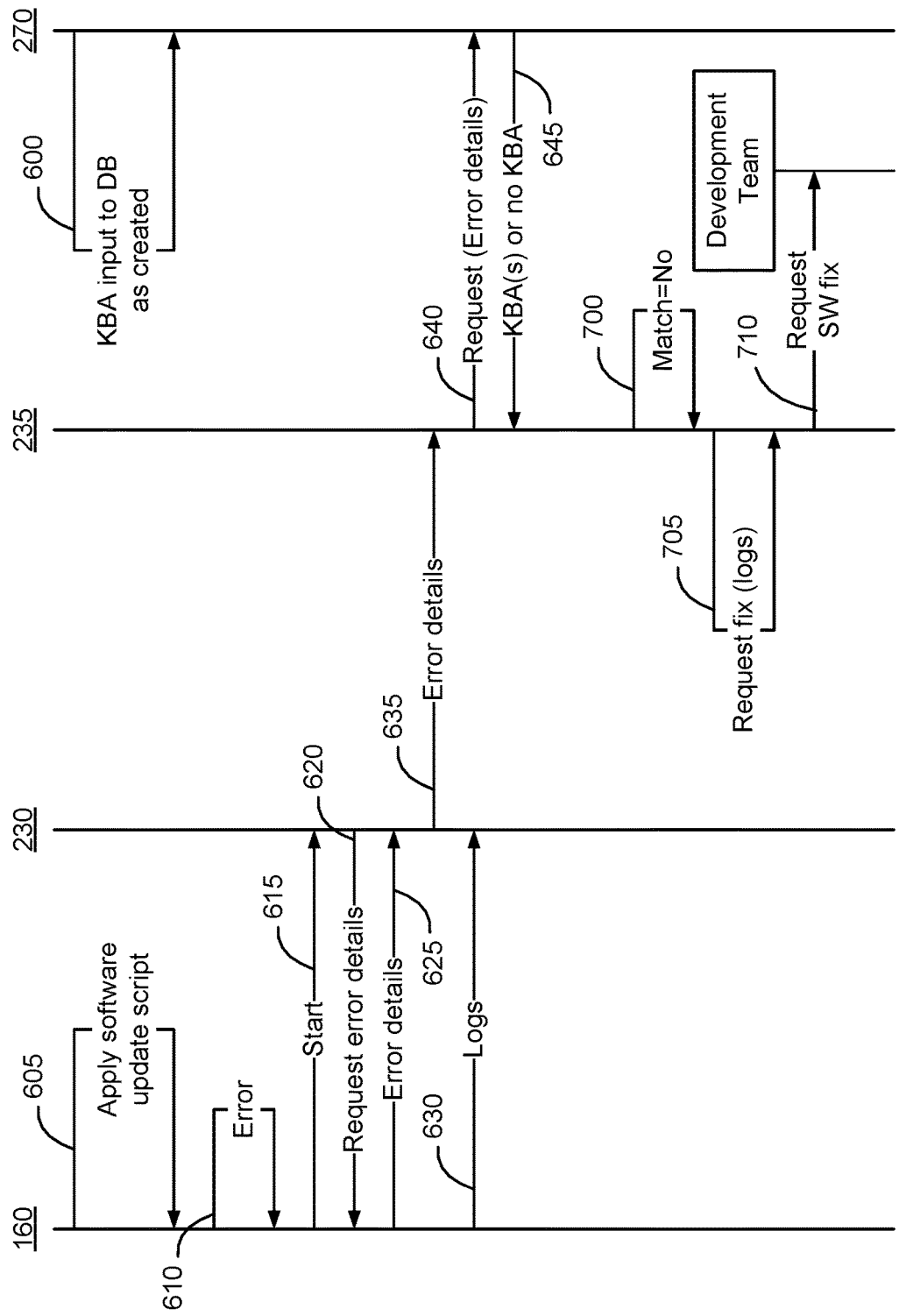

SOFTWARE MODIFICATION ERROR RESOLUTION AND MANAGEMENT

FIELD

This disclosure relates to computing systems and related devices and methods, and, more particularly, to software modification error resolution and management during installation, upgrades, and service procedures, for containerized software applications.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A software update manager instantiates an error resolution system upon occurrence of an error during a software modification operation. According to some embodiments, a software update manager has a log collector that is configured to collect logs, container statistics, product configuration information, and system state from the application that is being modified when an issue is encountered during a software modification operation. The software update manager also includes an issue analyzer that is started when an error is encountered, and is configured to analyze the reported issue and search knowledge base article database(s) to determine if the reported issue is a known issue or a previously unknown issue. In response to a determination by the software update manager that the reported issue is a known issue, the software update manager retrieves a known workaround and applies the known workaround on the system to resolve the reported issue and continues the planned software modification operations. In response to a determination by the software update manager that the reported issue is a previously unknown issue, the software update manager identifies the correct engineering team responsible for responding to the reported issue and generates a bug fix request that is submitted to a software bug tracking system.

In some embodiments a method of implementing a software modification process by a software update manager, includes initiating the software modification process of a software package by the software update manager, the software update manager executing a software update script defining the software modification process to be implemented on the software package, determining occurrence of an error during the software modification process by an error detection and log collection system, in response to determining the occurrence of the error, collecting logs associated with the software modification process and the software package by the error detection and log collection system, and transmitting the error and logs from the error detection and log collection system to the software update manager. In response to receipt of the error, starting an instance of an error resolution system, providing the error to the error resolution system, parsing the error by the error resolution system to generate a knowledge base article database inquiry, using the knowledge base article database inquiry to obtain a set of knowledge base articles from a knowledge base article database, determining a reliance value for each of the set of knowledge base articles, and comparing respective reliance values with a reliance threshold value. In response to a determination that the reliance value of a first knowledge base article of the set of knowledge base articles exceeds the reliance threshold value, the method includes identifying a workaround based on the first knowledge base article and applying the workaround to the software modification process on the software package. In response to a determination that no knowledge base article in the set of knowledge base articles has a respective reliance value in excess of the reliance threshold value, the method includes automatically generating an error correction request in a software bug tracking system.

In some embodiments, the error includes an error code, an error description, and a description of symptoms associated with the error, and wherein the logs contain an indication of a place in the software modification process where the error occurred.

In some embodiments, parsing the error by the error resolution system to generate a knowledge base article database inquiry, comprises extracting the error code, the error description, and the description of symptoms from the error received from the error detection and log collection system error.

In some embodiments, each knowledge base article in the set of knowledge base articles includes an error code associated with a previously fixed error, an error description of the previously fixed error, an indication of a place in a previous software modification process where the previously fixed error occurred, and a description of symptoms associated with the previously fixed error.

In some embodiments, determining the reliance value for each of the set of knowledge base articles comprises comparing the error code from the error, with the error code of each respective knowledge base article.

In some embodiments, determining the reliance value for each of the set of knowledge base articles comprises using natural language processing to compare the error description from the error, with the error description of each respective knowledge base article.

In some embodiments, determining the reliance value for each of the set of knowledge base articles comprises using natural language processing to compare the description of symptoms associated with the error, with the description of symptoms associated with the respective previously fixed error of each respective knowledge base article.

In some embodiments, when multiple knowledge base articles are included in the set of knowledge base articles, determining the reliance value for each of the set of knowledge base articles comprises comparing the indication of the place in the software modification process where the error occurred from the error, with the respective indication of the place in the previous software modification process where the previously fixed error occurred of each respective knowledge base article.

In some embodiments, the method further includes, after applying the workaround to the software modification process on the software package, determining if the workaround solved the error.

In some embodiments, the method further includes, in response to a determination that the workaround solved the error, resuming the software modification process of the software package by the software update manager.

In some embodiments, the method further includes, in response to a determination that the workaround failed to solve the error, automatically generating an error correction request in a software bug tracking system.

In some embodiments, automatically generating the error correction request in the software bug tracking system comprises selecting an engineering team from a plurality of engineering teams, and addressing the error correction request to the selected engineering team.

In some embodiments, selecting the engineering team comprises determining from the logs a location in the software update script where the error occurred to identify a software module that caused the error, and determining the engineering team responsible for the software modification process associated with the software module.

In some embodiments, automatically generating the error correction request in the software bug tracking system comprises including the logs in the error correction request.

In some embodiments, the error resolution system is an application executing in a container, and wherein starting the instance of the error resolution system comprises starting a stopped instance of the container.

In some embodiments, the method further includes stopping the instance of the container after applying the software process on the software package or after generating the error correction request.

In some embodiments, identifying the workaround based on the first knowledge base article comprises extracting the workaround from the knowledge base article.

In some embodiments, identifying the workaround based on the first knowledge base article comprises transmitting a request for workaround details associated with the knowledge base article.

BRIEF DESCRIPTION OF THE DRAWINGS

FIG. 7 is a swim lane diagram of a process of managing failures during installation, upgrades, and service procedures, for containerized software applications when a previously unknown issue is encountered, according to some embodiments.

DETAILED DESCRIPTION

Aspects of the inventive concepts will be described as being implemented in a storage system 100 connected to a host computer. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
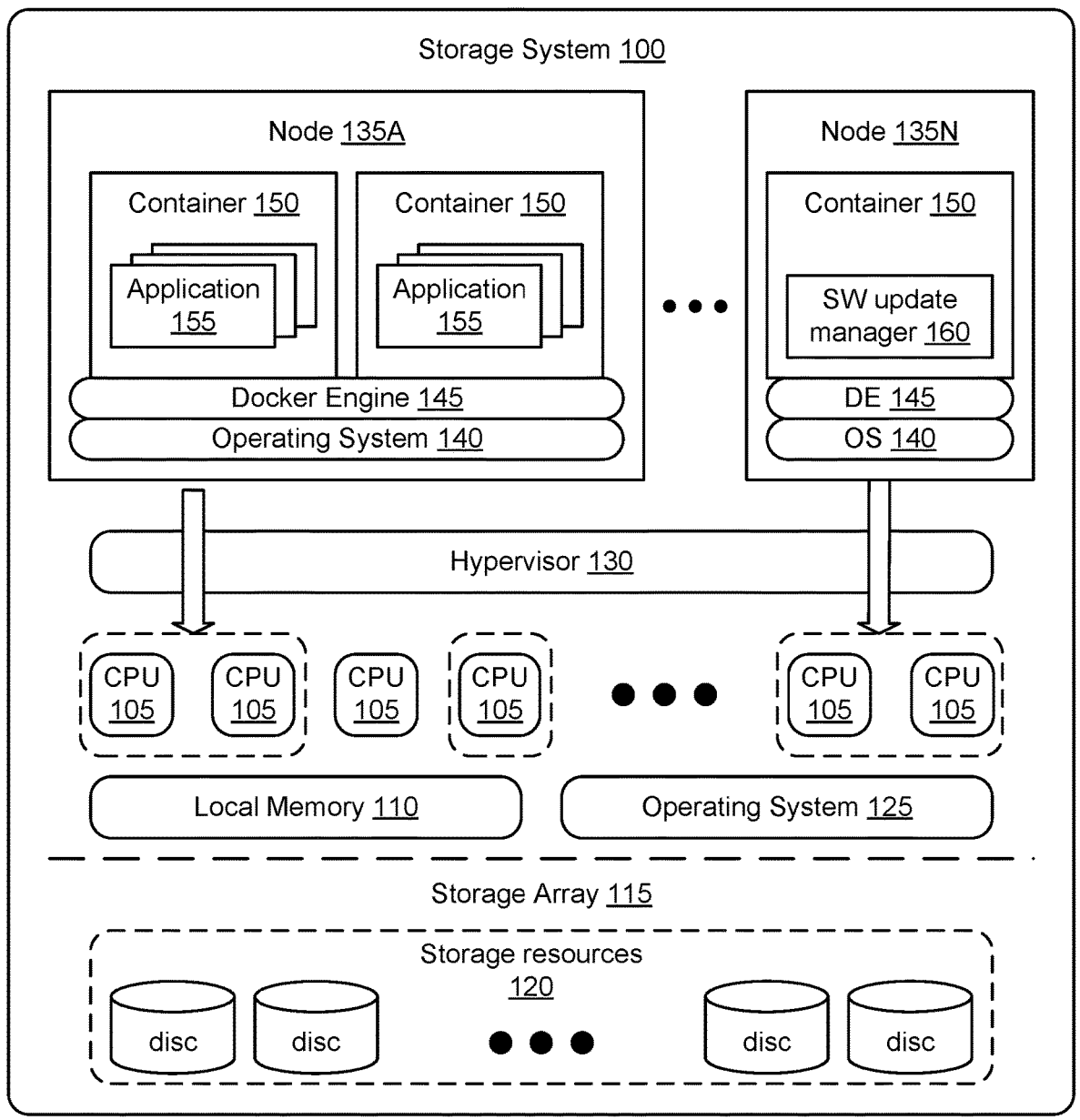
FIG. 1 is a functional block diagram of an example storage system with an example software update manager configured to implement an error resolution and management system, according to some embodiments.

FIG. 1 is a functional block diagram of an example storage system 100. As shown in FIG. 1, the storage system 100 has physical resources including a number of processor cores 105, local memory 110, a storage array 115 including storage resources 120, and other physical resources. An operating system 125 controls operation of the storage system and a hypervisor 130 abstracts the physical resources of the storage system 100 from nodes 135, and allocates physical resources of storage system 120 for use by the nodes 135.

The storage system 100 maintains data for the host applications running on host computers. For example, a given host application may write data of host application to the storage system 100 and read data of host application from the storage resources 120 of storage system 100 in order to perform various functions. Examples of host applications may include but are not limited to file servers, email servers, block servers, and databases.

The processors 105 may include one or more multi-core processors that include multiple CPUs (Central Processing Units), GPUs (Graphics Processing Units), and combinations thereof. The local memory 110 may include, for example and without limitation, any type of RAM.

In some embodiments, storage resources 120 are dedicated to providing data storage to storage system 100 or are shared between a set of storage systems 100. Storage resources 120 may be implemented using numerous types of memory technologies for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives.

In some embodiments the managed drives of storage resources 120 are implemented using NVM (Non-Volatile Memory) media technologies, such as NAND-based flash, or higher-performing SCM (Storage Class Memory) media technologies such as 3D XPoint and ReRAM (Resistive RAM).

Figure 2:
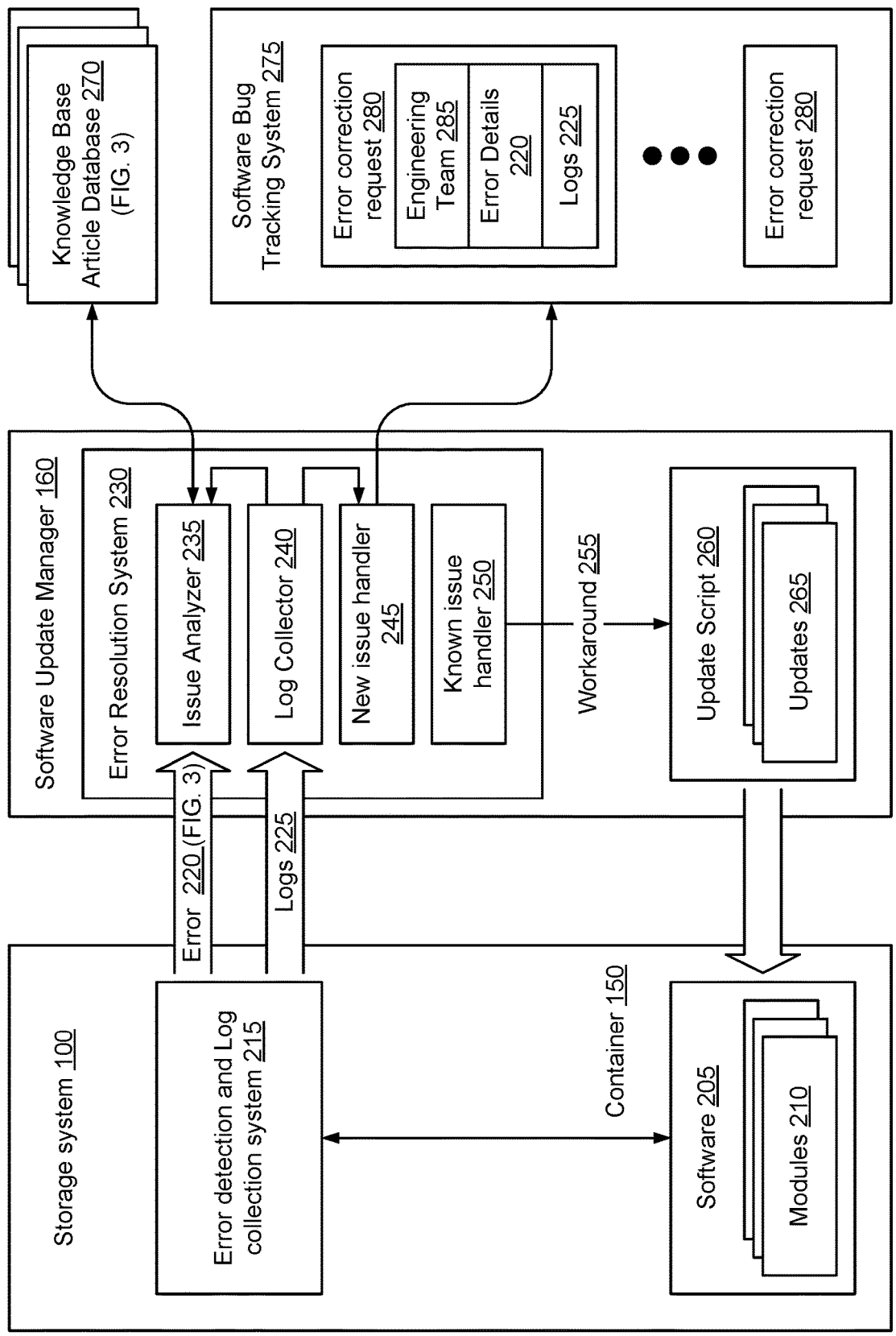
FIG. 2 is a functional block diagram an example software update error resolution and management system, according to some embodiments.

Each node 135 has an operating system 140 and one or more application processes running in the context of the operating system. In some embodiments, as shown in FIG. 2, the storage system provides an advanced hypervisor-like environment to host guest operating systems 140. Each guest operating system 140 also runs a docker engine 145 to host a set of containers 150. Each container 150 includes one or more applications 155 configured to execute within the environment provided by the container.

Containers, such as Docker containers, are portable and standalone application software. Containers are deployed on a host Operating System (OS) 140 and continue to run on these hosts. If a user wants to send a command to the container, the user can execute the command from the host. Unlike Virtual Machines, containers do not require separate Operating Systems. Multiple containers can be hosted on a single OS 140. Although some embodiments will be described in which the containers are implemented using Docker containers, it should be understood that other forms of containers can be used as well depending on the implementation.

As shown in FIG. 1, unlike a virtual machine, a container 150 does not have its own operating system but rather runs on top of the host operating system 140. A Docker daemon (persistent process) executes on the operating system 140 to enable the Docker container 150 to be implemented on the operating system 140.

In some embodiments a Docker image is created that includes one or more applications 155 that should execute in the container 150. A Docker container image is a lightweight, standalone, executable package of software that includes everything needed to run an application: code, runtime, system tools, system libraries and settings. Container images become containers at runtime. In the case of Docker containers, Docker images become containers when they run on the Docker Engine 145.

The Docker container 150 contains application code which, when executing, are implemented using application daemons. The Docker container 150 also includes one or more virtual network interfaces to the host operating system 140 and may include one or more dedicated network interfaces. The Docker container 150 may also include one or more dedicated block devices and one or more Docker volumes. The Docker container also includes any dependencies required by the application daemons to enable the application to execute within the Docker container. Example dependencies include libraries, environment variables, and other items depending on the implementation. Although some embodiments will be described in which the containers are implemented using Docker containers, it should be understood that other forms of containers can be used as well depending on the implementation.

Applications 155 are required to be maintained periodically, for example to fix errors that become known over time, to upgrade the applications to add new features, or for various other reasons. Software maintenance operations often result in particular applications being temporarily unavailable. Because storage systems contain data that is often considered vital for customer's business needs, the critical maintenance window on a production system is small and upgrade or service activity is expected to be complete within a minimum amount of time as possible. Any issues encountered during software maintenance can have an adverse effect on the availability of the systems for production. Additionally, when an error in a software installation, upgrade, or service activity is encountered, the work of log collation, looking for solutions to the issue in known issues databases, applying workarounds for known issues, and filing tickets for new issues is very time consuming and is prone to human errors. This delay, in addition to the delay associated with encountering issues in maintenance, is very important to be reduced to achieve a better total customer experience.

In particular, when an issue is encountered during software installation, software upgrade, or service maintenance, the issue can result in a large maintenance window, which means that the production system is down for an extended period of time. In addition, when an error is encountered, resolution of the error often requires multiple different teams to become involved to identify the error, and research known issue databases to determine if there is a known workaround for the identified error. The accuracy of that process is often dependent on human intelligence and experience, and can result in multiple false positives which results in attempted workarounds that are unable to fix the identified error. Further, because the recovery process is manually implemented, often system logs are not immediately collected, which can result in lost logs, which can make it difficult to subsequently identify the true error, for example when the initial error assessment turns out to be incorrect. Finally, some errors are caused due to product configuration issues, which might be resolved simply by changing the configuration of the software that is the subject of the upgrade/maintenance processes.

As shown in FIG. 2, in some embodiments a software update manager 160 is configured to manage configuration, service, and maintenance for the other applications 155. In some embodiments, the software update manager 160 executes as an application in a container 150 and provides various procedures for upgrading, reinstalling, and otherwise managing software installation, software upgrade, or service maintenance on the storage system 100. Example software management software includes Symmwin, Simplified Symmwin, and Unisphere, which are management tools available from Dell®. It should be understood that other software installation, software upgrade, or software maintenance management tools may be used as well depending on the implementation. Although FIG. 1 shows some embodiments in which the software update manager 160 is implemented in a container 150 on storage system 100 where the applications 155 reside, it should be understood that the software update manager 160 may also be implemented external to storage system 100 such as on an external host computer.

Storage administrators use the software update manager 160 to perform software installations, software upgrades, software configuration changes, and other maintenance activities on applications 155. For convenience, all such activities are collectively referred to herein as "software modifications". For existing software, the term "software modifications," as used herein, includes any change to an application 155 resulting in modified behavior of the software 155, including but not limited to adaptive maintenance (modification of software to keep it usable in a changed or changing environment), corrective maintenance (reactive modification of a software product to correct discovered faults), and perfective maintenance (modification of a software product to improve performance or maintainability. The term "software modifications" also includes initial installation of new software 155 to a storage system 100.

When software modifications are planned on a storage system 100, the software modifications will be planned during a critical and time bound maintenance window, to ensure that the software modifications have the least impact on data availability. According to some embodiments, when issues are encountered during planned maintenance activities, the software update manager 160 is configured to collect logs, configuration information, and system state from the application 155 that is being modified, and to analyze the reported issue and search one or more knowledge base article database(s) to determine if the reported issue is a known issue or a previously unknown issue. In response to a determination by the software update manager 160 that the reported issue is a known issue, the software update manager 160 retrieves a known workaround and applies the known workaround on the system to resolve the reported issue and continue the planned software modification operations. In response to a determination by the software update manager 160 that the reported issue is a previously unknown issue, the software update manager 160 identifies the correct engineering team responsible for responding to the reported issue and generates a bug fix request that is submitted to a software bug tracking system.

By providing an intelligent, fully automated system to triage and analyze reported issues during software modification operations, it is possible to automatically recover a system when known issues are encountered based on documented workarounds and recovery steps. It is also possible to automatically generate bug fix requests which are sent to the appropriate development or engineering team whenever a previously unknown issue is encountered during the software modification operations.

FIG. 2 is a functional block diagram an example software update error resolution and management system, according to some embodiments. As shown in FIG. 2, in some embodiments a software update manager 160 is configured to apply an update script 260 containing a set of updates 265 to software 205 on storage system 100. In some embodiments, the software 205 includes a plurality of software modules 210, for example that may need to be updated during the software modification operation using updates 265.

In some embodiments, the storage system 100 includes an error detection and log collection system 215 configured to detect errors 220 during software modification operations. If an error is detected during application of the update script 260 to the software 205, the error detection and log collection system 215 generates error 220 and collects logs 225. Example logs might include the state of execution of the update script, the identity of the update 265 being applied to the software 205, the module 210 that was the target of the software modification operation, logs generated during the software modification operation, configuration parameters of the software 205 and/or modules 210, and numerous other aspects of the state of the software 205 and the state of the update at the time of occurrence of the error 220.

As shown in FIG. 2, in some embodiments the software update manager 160 is configured to spawn an instance of an error resolution system 230 upon occurrence of an error 220. In some embodiments, the error resolution system 230 is implemented using a container that is generally kept in a stopped condition on the software update manager 160.

Upon occurrence of an error 220 during a software modification operation, the software update manager 160 starts the error resolution system 230 container to enable the error resolution system 230 to be used to manage the failure associated with the error that occurred during the software modification operation on the containerized software application 205.

In some embodiments, the error resolution system 230 that is started in response to a determination of occurrence of error 220 includes an issue analyzer 235, a log collector 240, a new issue handler 245, and a known issue handler 250. As discussed in greater detail herein, when error 220 is received by the software update manager 160, the software update manager 160 starts the error resolution system 230. When error resolution system 230 starts, the log collector 240 is started and immediately collects logs 225 associated with the error 220. The issue analyzer 235 is started, retrieves the error 220, and parses the error and searches one or more knowledge base article database(s) 270 to determine if the error is a known issue or a previously unknown issue. If the error is a known issue, a workaround 255 for the known issue is obtained and applied by the known issue handler 250 to cause the update script 260 to apply the identified workaround to the software 205, thus resolving the error 220. If the error is a previously unknown issue, the new issue handler 245 interacts with a software bug tracking system 275 to create an error correction request 280. In some embodiments, the error correction request 280 includes an identification of the engineering team 285 that is the target of the error correction request 280, the error details 220, and the logs 225. One example software bug tracking system 275 is Jira™, which is a proprietary issue tracking product developed by Atlassian. Other software bug tracking systems 275 may be used as well, and the invention is not limited to using Jira as the software bug tracking system 275.

Accordingly, in some embodiments the software update manager 160 is configured to include an intelligent, fully-automated system to triage and analyze issues. In instances where the error is based on a known issue, the error resolution system 230 is able to automatically recover the system (software 205) using documented workaround and recovery steps. In instances where the error is based on a previously unknown issue, the error resolution system 230 collects relevant logs and configuration data 225, and automatically files an error correction request 280 (e.g., a JIRA defect) to appropriate development/engineering team 285 to request creation of a workaround or other fix to enable the software modification operation to be implemented on software 205.

Figure 3:
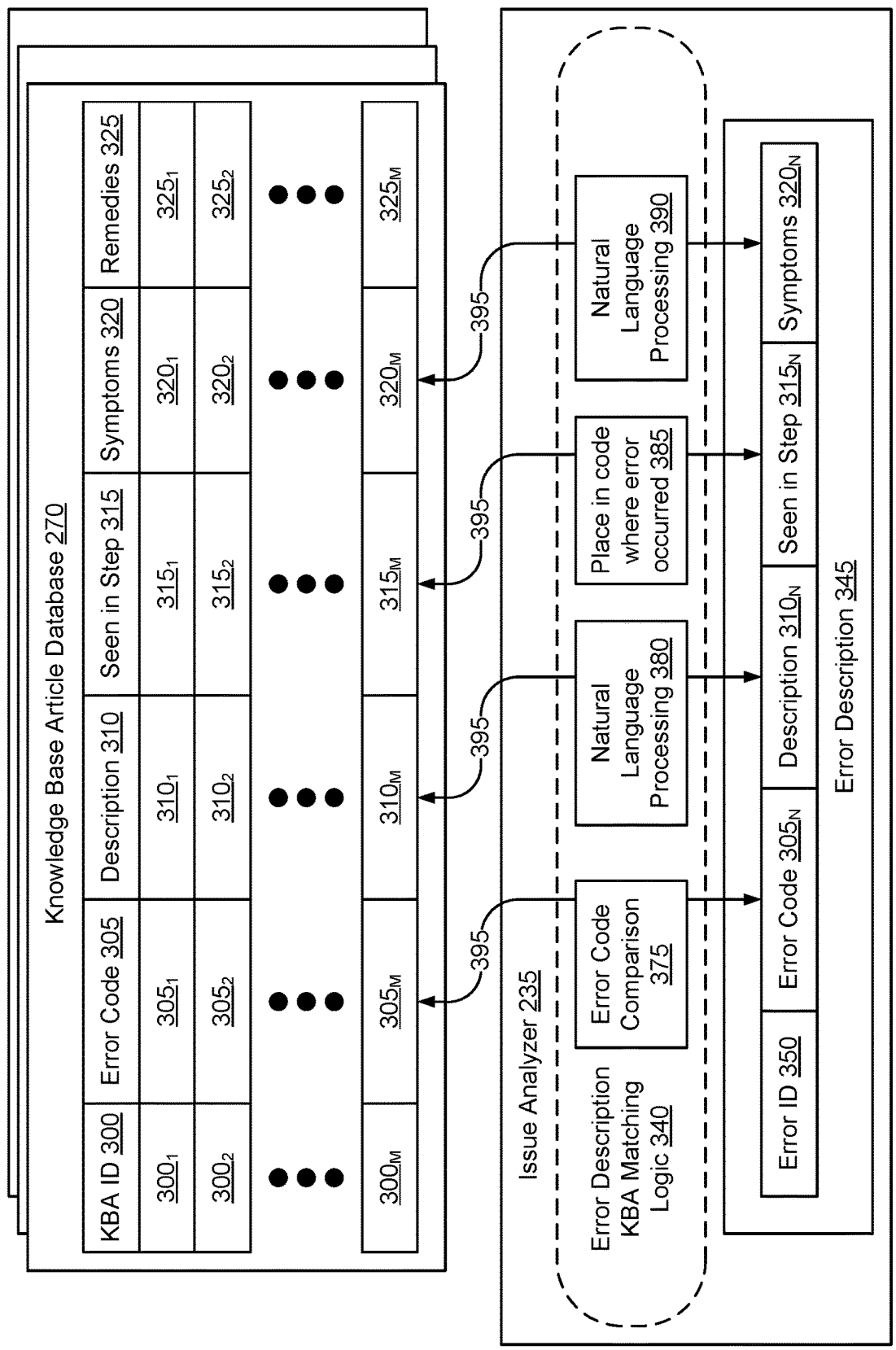
FIG. 3 is a functional block diagram an example issue analyzer of the software update error resolution and management system of FIG. 2 interacting with one or more knowledge base article database(s), according to some embodiments.

FIG. 3 is a functional block diagram an example issue analyzer 235 of the software update error resolution and management system of FIG. 2 interacting with one or more knowledge base article database(s) 270, according to some embodiments. As shown in FIG. 3, in some embodiments a Knowledge Base Article (KBA) database 270 includes a group of knowledge base articles. For example, as errors are encountered by the engineering and development teams, or other people that work on software 205 and modules 210, the resolution of the errors and issues are documented and entered into the knowledge base article database 270.

FIG. 3 shows an example knowledge base article database 270 including knowledge base articles that are identified using knowledge base article identifiers (KBA IDs) $300_1$-$300_M$. The KBA IDs may be numbers assigned to the knowledge base articles to enable the knowledge base articles to be uniquely identified within the one or more knowledge base article database(s) 270. Each knowledge base article also includes information describing the issue that caused the knowledge base article to be created. Example information describing the problem addressed by the knowledge base article might include an error code 305, a description of the error 310, an identification of the software and the step in the software where the error occurred 315, symptoms associated with the error 320, and remedies 325 that were implemented to resolve the error. The knowledge base articles might include additional information or less information depending on the particular implementation of the knowledge base article database 270. In some embodiments, the issue analyzer 235 is configured to interact with one, a subset, or multiple available knowledge base article databases 270 in response to receipt of error 220.

In some embodiments, error 220 contains a collection of types of information that is similar to the information contained in the knowledge base articles stored in the knowledge base article database 270. For example, as shown in FIG. 3, in some embodiments the error 220 includes an example error description 345. The error description, in this example, includes an error ID 350 that allows the error to be identified within the software update manager 160, an error code 305, a description of the error 310, an indication of the location in the code of software 205 where the error occurred (seen-in-step 315), and optionally a description of symptoms 320 associated with the error.

As shown in FIG. 3, in some embodiments the issue analyzer 235 has error description knowledge base article matching logic 340 configured to parse the error description 345 to extract the error codes 305, description 310, seen-in-step information 315, and symptoms 320, to formulate one or more knowledge base article database search requests (arrows 395). Different errors might be formulated differently, depending on the particular error generated during the failed software modification operation. By parsing the error description 345, the error description knowledge base article matching logic 340 is able to extract relevant information to be used to search for relevant knowledge base articles in the one or more knowledge base article database(s) 270.

In some embodiments, the error description knowledge base article matching logic 340 includes an error code comparison module 375 configured to compare the error code $305_N$ parsed from the error description 345 with the error codes $305_1$-$305_M$ of knowledge base articles returned from one or more knowledge base article database(s) 270. Similarly, the error description knowledge base article matching logic 340 includes comparison module 385 configured to compare the place in the software where the error occurred (seen-in-step $315_N$) parsed from the error description 345 with the places in the software where the errors that form the basis of the knowledge base articles occurred ($315_1$-$315_M$).

In some embodiments, the error description knowledge base article matching logic 340 includes one or more natural language processing modules 380 configured, for example, to compare the error description $310_N$ with the error descriptions $310_1$-$310_M$ contained in the knowledge base articles. In FIG. 3, the error description knowledge base article matching logic 340 also includes a second natural language processing module 390 configured, for example, to compare a description of the symptoms $320_N$ with the symptom descriptions $320_1$-$320_M$ contained in the knowledge base articles.

Natural language processing is a subfield of linguistics, computer science, and artificial intelligence concerned with the interactions between computers and human language, in particular how to program computers to process and analyze large amounts of natural language data. Although FIG. 3 shows some embodiments in which separate natural language processing modules are used to compare the descriptions 310 and symptoms 320, it should be understood that a single process may be used to implement both processes. Using natural language processing, the logic 340 is able to determine a reliance value of the knowledge base articles returned from the knowledge base article search. For example, in some embodiments the natural language processing modules 380 and 390 are able to compare key words of the error description $310_N$ and key words of the error symptom $320_N$ with the knowledge base article descriptions 310 and knowledge base article symptoms 320, to determine a reliance value for each returned knowledge base article.

Figure 4:
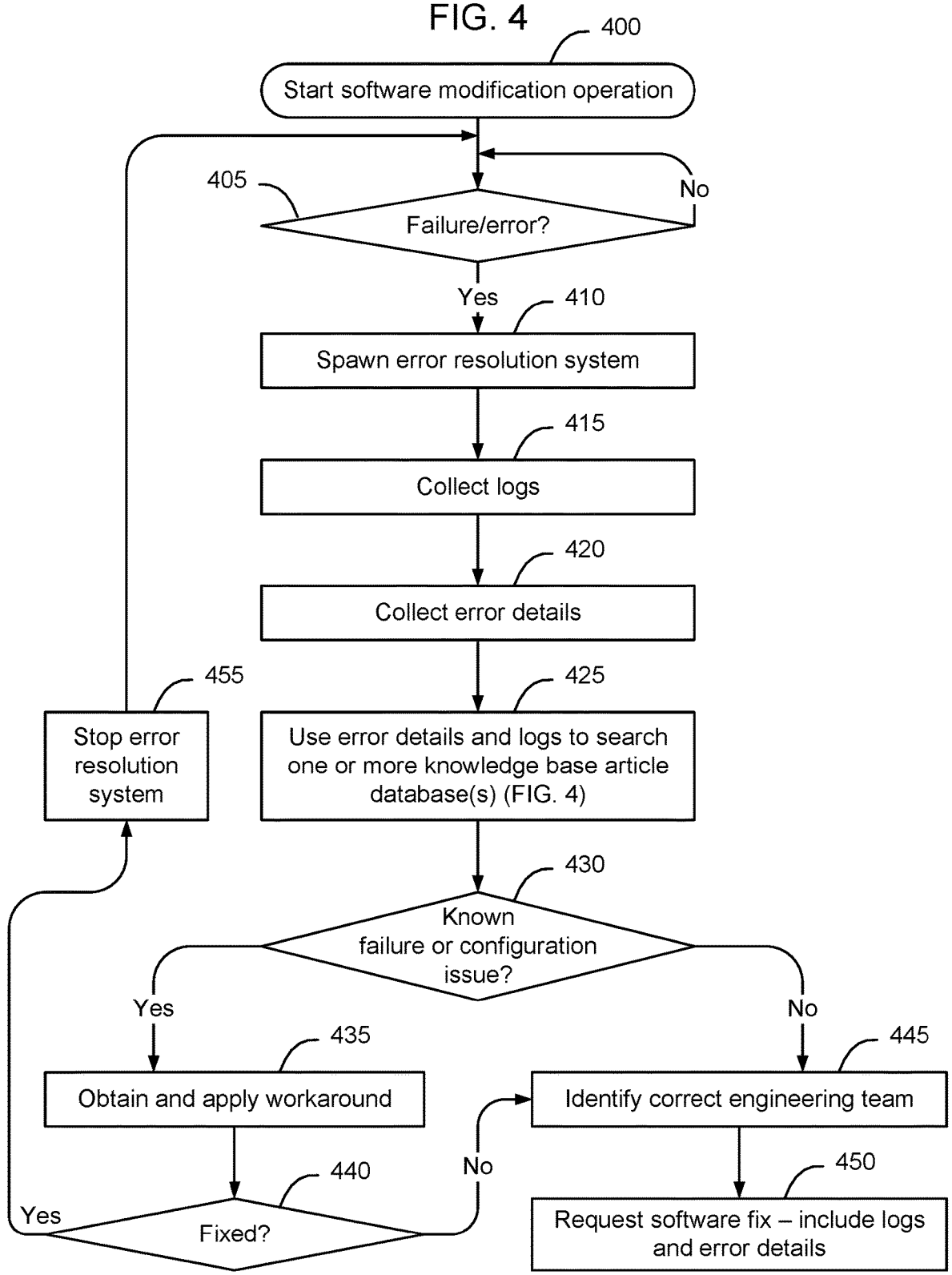
FIG. 4 is a flow chart of a process of managing failures during software installation, software upgrades, and software service procedures, for containerized software applications, according to some embodiments.

FIG. 4 is a flow chart of a process of managing failures during software installation, software upgrades, and software service procedures, for containerized software applications, according to some embodiments. As shown in FIG. 4, in some embodiments, a software modification operation is started (block 400), for example by software update manager 160. Optionally, in connection with starting the software modification operation (block 400), a container containing the error resolution system 230 may be started and then stopped. By starting the container, and then stopping the container, it is possible to quickly restart the container containing the error resolution system 230 upon occurrence of the error 220. However, stopping the container also enables the error resolution system 230 to not be always running on the software update manager 160 to conserve CPU resources. Also, by starting the error resolution system 230 container, and then stopping the container, any state associated with the error resolution system 230 will be retained as long as the container is not killed.

Once the software modification operation has been started (block 400) the software update manager 160 will monitor to determine if an error 220 is received from the error detection and log collection system 215 on the storage system 100 (block 405). While a failure/error is not received (a determination of NO at block 405) the software modification operation will continue.

When an error 220 is received (a determination of YES at block 405) the error resolution system 230 is started (block 410). In instances where the error resolution system 230 is implemented using a stopped container, the error resolution system 230 may be started by starting the stopped container containing the error resolution system 230. In embodiments where a container has not previously been started, a new container may be started, for example using a Docker image containing the error resolution system 230.

The error resolution system 230 collects the logs 225 associated with the error (block 415) and collects the error details (block 420). Example error details are shown, for example, in connection with FIG. 3. The error details are then used to search the one or more knowledge base article database(s) 270 (block 425) to determine if the error is associated with a known failure or known configuration issue, or if the error is associated with a previously unknown issue (block 430).

In response to a determination that the error is associated with a known failure or known configuration issue (a determination of YES at block 430), the error resolution system 230 obtains and applies a workaround (block 435). For example, in some embodiments the knowledge base article might include remedy 325 detaining a workaround to be applied. In other embodiments, the workaround might be referenced by the knowledge base article, thus requiring the issue analyzer 235 to retrieve the workaround prior to applying the workaround 255. Once the workaround has been obtained and applied (block 435), in some embodiments the error resolution system 230 determines whether the error has been fixed (block 440). If the error has been fixed (a determination of YES at block 440), the error resolution system 230 is stopped (block 455) and the software update manager 160 continues the process of implementing the software modification operation and monitoring for subsequent errors 220.

In response to a determination that the error is associated with a previously unknown issue (a determination of NO at block 430), or if the error is not able to be fixed by application of a first workaround 255 (a determination of NO at block 440), the error resolution system 230 identifies the correct engineering team to be contacted to resolve the error (block 445). In some embodiments, the correct engineering team is determined from the logs 225 and is based, for example, on the update 265 being applied at the time of the error, the module 210 being updated at the time of the error, or the location where the error occurred, for example by determining the location of the error described in the seen-in-step portion 215 of the error description 345. Once the correct engineering team has been identified (block 445) a request is generated and submitted by the new issue handler 245 to the software bug tracking system 275 to request that the error in the software be fixed (block 450). Advantageously, since the log collector 240 previously collected the logs 225, the logs 225 and error details 220 are able to be provided in connection with the error correction request 280. Providing the logs 225 with the error correction request 280 simplifies the process of correcting the error, since an engineer or team tasked with the request 280 is not required to go back, after-the-fact, to attempt to collect any logs for the storage system or software 205, which may no longer exist.

Figure 5:
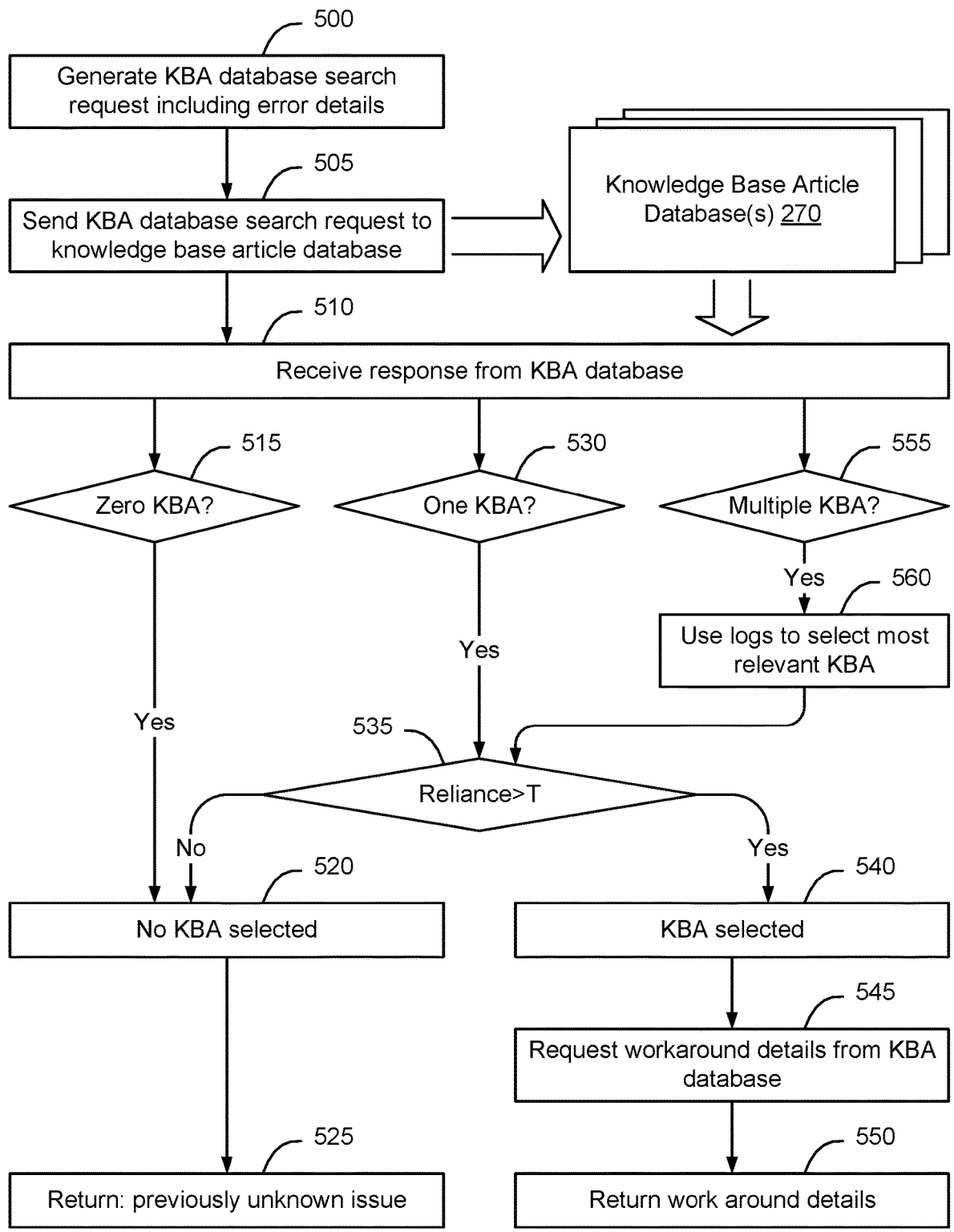
FIG. 5 is a flow chart of a process of using error details and logs to search one or more knowledge base article database(s) for known issue workaround during a process of managing failures during installation, upgrades, and service procedures, for containerized software applications, according to some embodiments.

FIG. 5 is a flow chart of a process of using error details and logs to search one or more knowledge base article database(s) 270 for known issue workaround during a process of managing failures during installation, upgrades, and service procedures, for containerized software applications, according to some embodiments. As shown in FIG. 5, in some embodiments when an issue analyzer 235 is provided with an error 220, the issue analyzer 235 generates a knowledge base article (KBA) database search request including details of the error, for example as described in connection with FIG. 3 (block 500). The database search request 395 is then sent to one or more knowledge base article database(s) 270 (block 505).

The knowledge base article database search request (block 505) may be a single request containing all of the error details, or may be implemented using a hierarchical approach. For example, the issue analyzer 235 may request identification of all knowledge base articles associated with a particular error code 305, and then perform sub-searches within the universe of documents provided by the one or more knowledge base article database(s) 270 for example using the seen-in-step information 315 of the error or using terms parsed from the error description 310 and/or symptoms 320 to further refine the search to resolve on a finite number of potentially relevant knowledge base articles. Thus, although FIG. 5 shows some embodiments in which a knowledge base article database search request is generated, sent, and a response is received (block 510), it should be understood that this may be an iterative process that involves multiple knowledge base article database search requests and responses, depending on the implementation.

In response to receipt of the knowledge base article database search request (block 505), the knowledge base article database identifies a set of responsive knowledge base articles and provides a response to the knowledge base article search request which is received by the issue analyzer 235 (block 510).

A determination is then made by the issue analyzer 235 if there are zero knowledge base articles returned by the one or more knowledge base article database(s) 270 (block 515), if a single knowledge base article was returned by the knowledge base article database(s) 270 (block 530), or if multiple knowledge base articles were identified and returned by the knowledge base article database(s) 270 (block 555).

In response to a determination that zero knowledge base articles were returned by the one or more knowledge base article database(s) 270 (block 515), no knowledge base article is selected (block 520), and the process returns an indication that the error is associated with a previously unknown issue (block 525). Optionally, when zero knowledge base articles are returned (a determination of YES at block 515), the issue analyzer may re-formulate the request using different or additional information from the error description 345 (block 500), and resubmit the request to the knowledge base database 270 (arrow 505).

In response to a determination that one knowledge base article was returned by one of the knowledge base article database(s) 270 (a determination of YES block 530), in some embodiments the error description knowledge base article matching logic 340 of the issue analyzer 235 determines a reliance value by comparing the returned knowledge base article with the error description 345 (block 535). In some embodiments, if the reliance value is less than a threshold value T (a determination of NO at block 535), no knowledge base article is selected (block 520), and the process returns an indication that the error is associated with a previously unknown issue (block 525). In some embodiments, the natural language processing module 380, and/or natural language processing module 390 is used to compare the error description and/or error symptoms of the error description 345 with corresponding portions of the knowledge base articles to determine a similarity between the error and the returned articles. The similarity between the error description/symptoms and previous error descriptions and symptoms reported in the knowledge base articles enables the issue analyzer 235 to determine a reliance value for each of the returned knowledge base articles.

If the reliance value is equal to or greater than the threshold value T (a determination of YES at block 535), the knowledge base article is selected. (block 540). The issue analyzer 235 then requests a workaround based on the selected knowledge base article (block 545), for example by requesting the workaround from the knowledge base article database 270 if the workaround was not included in the selected knowledge base article. The issue analyzer 235 then returns the workaround details (block 550).

In some embodiments, if the reliance value is less than a threshold value T (a determination of NO at block 535), no knowledge base article is selected (block 520), and the process returns an indication that the error is associated with a previously unknown issue (block 525).

In response to a determination that multiple knowledge base article have been returned by the one or more knowledge base article database(s) 270 (a determination of YES block 555), in some embodiments the error description knowledge base article matching logic 340 of the issue analyzer 235 uses the logs 225 to select a most relevant knowledge base article (block 560). The error description knowledge base article matching logic 340 of the issue analyzer 235 then determines a reliance value of the selected knowledge base article by comparing the selected knowledge base article with the error description 345 (block 535).

If the reliance value of the selected knowledge base article is equal to or greater than the threshold value T (a determination of YES at block 535), the knowledge base article is selected. (block 540). The issue analyzer 235 then requests a workaround based on the selected knowledge base article (block 545), for example by requesting the workaround from the knowledge base article database 270 if the workaround was not included in the selected knowledge base article. The issue analyzer 235 then returns the workaround details (block 550).

In some embodiments, if the reliance value is less than a threshold value T (a determination of NO at block 535), no knowledge base article is selected (block 520), and the process returns an indication that the error is associated with a previously unknown issue (block 525).

Figure 6:
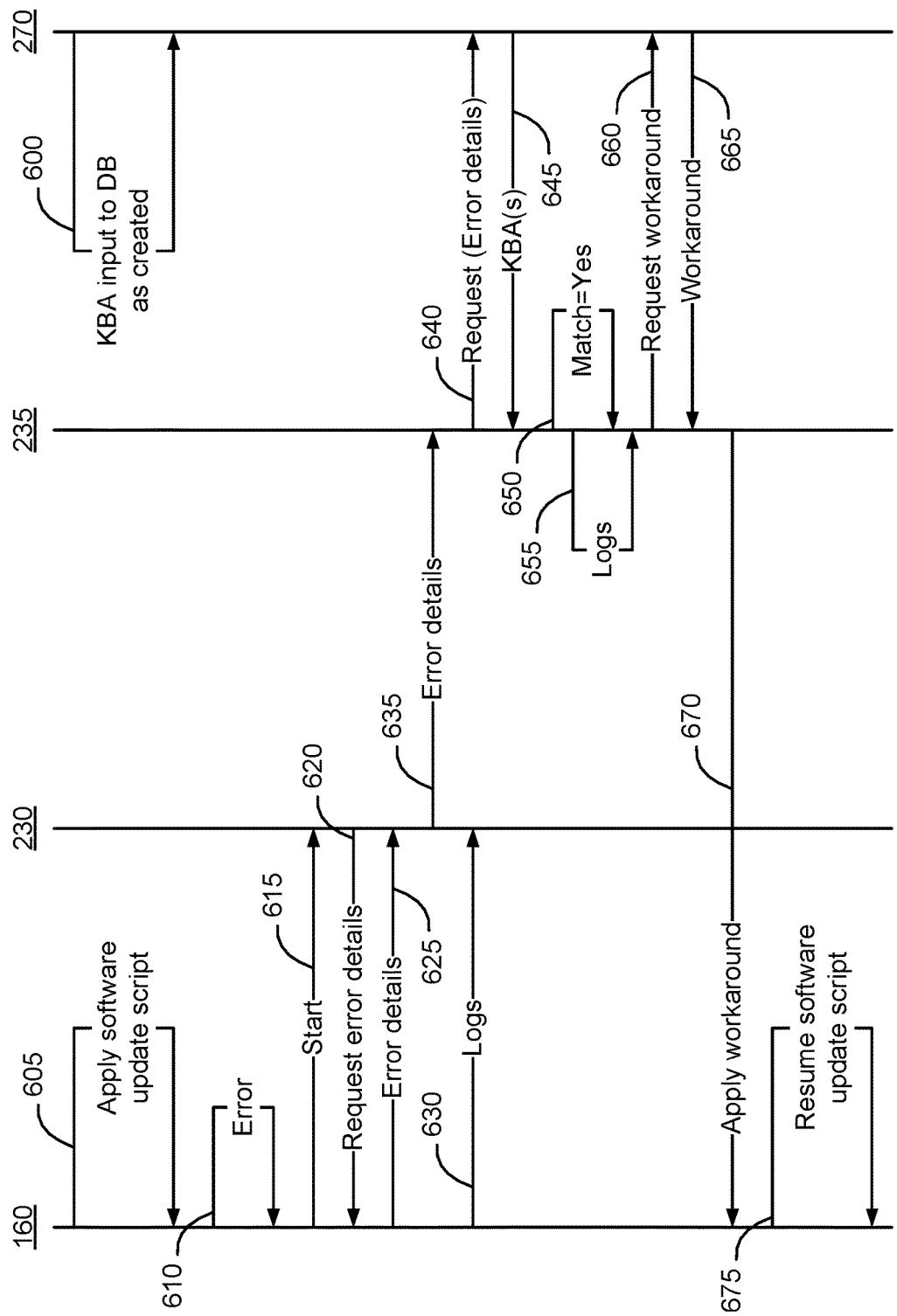
FIG. 6 is a swim lane diagram of a process of managing failures during installation, upgrades, and service procedures, for containerized software applications when a known issue is encountered, according to some embodiments.

FIG. 6 is a swim lane diagram of a process of managing failures during installation, upgrades, and service procedures, for containerized software applications when a known issue is encountered, according to some embodiments. As shown in FIG. 6, a software update manager 160 applies a software update script 260 to software 205 in connection with a software modification operation (arrow 605). An error is then reported to the software update manager 160 during the software modification operation (arrow 610). The software update manager 160 starts the error resolution system 230 (arrow 615). The error resolution system 230 requests the error details and logs from the software update manager 160 (arrow 620). The software update manager 160 responds with the error details (arrow 625) and the logs (arrow 630). Optionally the error details and logs may be returned in the opposite order or together depending on the implementation.

The error resolution system 230 provides the error details to the issue analyzer 235 (arrow 635) which uses the error details to send a request (arrow 640) for relevant knowledge base articles to the one or more knowledge base article database(s) 270. As shown in FIG. 6, whenever errors are encountered and fixed, knowledge base articles are generated and input to the one or more knowledge base article database(s) 270 (arrow 600). Accordingly, the knowledge base article database(s) are repositories of knowledge base articles describing previous software errors and resolutions of those previous software errors. The one or more knowledge base article database(s) 270 generates and transmits a response to the request for relevant knowledge base articles (arrow 645).

The issue analyzer 235 then determines whether there is a match (arrow 650) by comparing the returned knowledge base articles with the error description 345. In some embodiments, the returned knowledge base articles are compared using the error description knowledge base article matching logic 340 of the issue analyzer 235. Optionally, if multiple knowledge base articles are returned in arrow 645, the logs 225 can be used (arrow 655) to select one of the knowledge base articles, for example by enabling the issue analyzer 235 to determine the place in the code where the error occurred, and looking for knowledge base articles that also address resolution of failures at the same place in the code where the error occurred.

In FIG. 6, a determination is made by the issue analyzer 235 that the error is associated with a known issue (arrow 650 Match=YES). Accordingly, the issue analyzer 235 requests a workaround (arrow 660), which is provided by the knowledge base article database 270 (arrow 665). The workaround is then applied (arrow 670) and the software modification operation is resumed (arrow 675).

FIG. 7 is a swim lane diagram of a process of managing failures during installation, upgrades, and service procedures, for containerized software applications when a previously unknown issue is encountered, according to some embodiments. FIG. 7 is similar to FIG. 6, except that in response to a request from the issue analyzer 235 (arrow 640), the response from the one or more knowledge base article database(s) 270 (arrow 645) contains no knowledge base articles, or the knowledge base articles returned by the one or more knowledge base article database(s) 270 are deemed to not have a relance value greater than the threshold T (arrow 700 Match=No).

Accordingly, in response to a determination that the issue is a previously unknown issue, a bug fix request is created which includes the error description 220 and logs 225 (arrow 705), and the request for the software fix is sent to a selected relevant software development team responsible for the software associated with the error (arrow 710), for example via a software bug tracking system 275.

Conventionally, when an installation, upgrade, or service procedure failed, a support case would be submitted and support personnel would become involved to start understanding the issue and taking action to resolve the problem associated with the procedure failure. By contrast, according to some embodiments, the fully automated system described herein is able to determine whether an issue is a known issue, and if the problem is a known issue is able to resolve the problem to make the failure transparent to the customer by fetching and applying a workaround from a knowledge base article database and continuing the software modification procedure. In instances where the problem is not a known issue, the system directly submits a bug fix request that is sent to the relevant engineering team, with additional information like the container statistics, product configuration, and memory statistics.

Identifying the correct engineering team based on the location of the error and other information in the error description 345 and logs 225, avoids the situation which previously could occur, where a service request might pass through several different engineering teams before finally being routed to the correct engineering team. This reduces the amount of time required to begin working on a correction when a previously unknown issue is encountered. By automatically collecting the logs, and including the logs in the error correction request, it is possible to ensure that the logs are not lost. This also reduces the amount of time required by the engineering team, since the engineering team that is responsible for handling the service request is not required to go back and attempt to manually collect additional information about the error from the storage system where the software modification operation was being applied.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor.

However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing a software modification process by a software update manager, comprising:
    initiating the software modification process of a software package by the software update manager, the software update manager executing a software update script defining the software modification process to be implemented on the software package;
    determining occurrence of an error during the software modification process by an error detection and log collection system;
    in response to determining the occurrence of the error, collecting logs associated with the software modification process and the software package by the error detection and log collection system;
    transmitting the error and logs from the error detection and log collection system to the software update manager;
    in response to receipt of the error, starting an instance of an error resolution system;
    providing the error to the error resolution system;
    parsing the error by the error resolution system to generate a knowledge base article database inquiry;
    using the knowledge base article database inquiry to obtain a set of knowledge base articles from a knowledge base article database;
    determining a reliance value for each of the set of knowledge base articles; and
    comparing respective reliance values with a reliance threshold value;
    in response to a determination that the reliance value of a first knowledge base article of the set of knowledge base articles exceeds the reliance threshold value, identifying a workaround based on the first knowledge base article and applying the workaround to the software modification process on the software package; and
    in response to a determination that no knowledge base article in the set of knowledge base articles has a respective reliance value in excess of the reliance threshold value, automatically generating an error correction request in a software bug tracking system.

2. The method of claim 1, wherein the error includes an error code, an error description, and a description of symptoms associated with the error, and wherein the logs contain an indication of a place in the software modification process where the error occurred.

3. The method of claim 2, wherein parsing the error by the error resolution system to generate a knowledge base article database inquiry, comprises extracting the error code, the error description, and the description of symptoms from the error received from the error detection and log collection system.

4. The method of claim 3, wherein each knowledge base article in the set of knowledge base articles includes an error code associated with a previously fixed error, an error description of the previously fixed error, an indication of a place in a previous software modification process where the previously fixed error occurred, and a description of symptoms associated with the previously fixed error.

5. The method of claim 4, wherein determining the reliance value for each of the set of knowledge base articles comprises comparing the error code from the error, with the error code of each respective knowledge base article.

6. The method of claim 4, wherein determining the reliance value for each of the set of knowledge base articles comprises using natural language processing to compare the error description from the error, with the error description of each respective knowledge base article.

7. The method of claim 4, wherein determining the reliance value for each of the set of knowledge base articles comprises using natural language processing to compare the description of symptoms associated with the error, with the description of symptoms associated with the respective previously fixed error of each respective knowledge base article.

8. The method of claim 2, wherein, when multiple knowledge base articles are included in the set of knowledge base articles, determining the reliance value for each of the set of knowledge base articles comprises comparing the indication of the place in the software modification process where the error occurred from the error, with a respective indication of a place in a previous software modification process where a previously fixed error occurred for each respective knowledge base article.

9. The method of claim 1, further comprising, after applying the workaround to the software modification process on the software package, determining if the workaround solved the error.

10. The method of claim 9, further comprising, in response to a determination that the workaround solved the error, resuming the software modification process of the software package by the software update manager.

11. The method of claim 9, further comprising, in response to a determination that the workaround failed to solve the error, automatically generating an error correction request in a software bug tracking system.

12. The method of claim 1, wherein automatically generating the error correction request in the software bug tracking system comprises selecting an engineering team from a plurality of engineering teams, and addressing the error correction request to the selected engineering team.

13. The method of claim 12, wherein selecting the engineering team comprises determining from the logs a location in the software update script where the error occurred to identify a software module that caused the error, and determining the engineering team responsible for the software modification process associated with the software module.

14. The method of claim 1, wherein automatically generating the error correction request in the software bug tracking system comprises including the logs in the error correction request.

15. The method of claim 1, wherein the error resolution system is an application executing in a container, and wherein starting the instance of the error resolution system comprises starting a stopped instance of the container.

16. The method of claim 15, further comprising stopping the instance of the container after applying the software process on the software package or after generating the error correction request.

17. The method of claim 1, wherein identifying the workaround based on the first knowledge base article comprises extracting the workaround from the knowledge base article.

18. The method of claim 1, wherein identifying the workaround based on the first knowledge base article comprises transmitting a request for workaround details associated with the knowledge base article.

* * * * *